United States Patent [19]

Markus

[11] Patent Number: 4,859,987

[45] Date of Patent: Aug. 22, 1989

[54] APPARATUS AND METHOD FOR MONITORING LIQUID LEVELS

[75] Inventor: James A. Markus, Stamford, Conn.

[73] Assignee: Casco Products Corporation, Bridgeport, Conn.

[21] Appl. No.: 131,907

[22] Filed: Dec. 11, 1987

[51] Int. Cl.$^4$ .............................................. B60Q 9/00
[52] U.S. Cl. ............................... 340/450; 340/450.3; 340/619; 250/577
[58] Field of Search ................. 340/59, 619; 250/577; 73/293; 123/196 S; 455/613; 372/38

[56] References Cited

U.S. PATENT DOCUMENTS

| | | |
|---|---|---|
| 3,299,770 | 1/1967 | Witt et al. . |
| 3,751,672 | 8/1973 | Michel et al. ..................... 250/218 |
| 3,766,395 | 10/1973 | Keir . |
| 3,818,470 | 6/1974 | Hirsbrunner et al. . |
| 3,834,235 | 9/1974 | Bouton et al. . |
| 3,850,528 | 11/1974 | DeBellis . |
| 3,887,836 | 6/1975 | Leete ............................. 340/331 X |
| 3,932,038 | 1/1976 | Schweizer et al. . |
| 3,939,470 | 2/1976 | Arai et al. . |
| 3,995,169 | 11/1976 | Oddon . |
| 4,037,967 | 7/1977 | Schweizer et al. . |
| 4,107,661 | 8/1978 | Crosby ............................. 340/688 |
| 4,134,022 | 1/1979 | Jacobsen ........................... 250/577 |
| 4,155,013 | 5/1979 | Spiteri ............................. 250/577 |
| 4,242,590 | 12/1980 | von Tluck ......................... 250/577 |
| 4,306,805 | 12/1981 | Arrington ......................... 356/133 |
| 4,354,180 | 10/1982 | Harding ............................ 340/619 |
| 4,440,022 | 4/1984 | Masom ............................. 73/293 |
| 4,468,567 | 8/1984 | Sasano et al. ..................... 250/577 |
| 4,503,419 | 3/1985 | Kidd et al. ........................ 340/59 |
| 4,513,277 | 4/1985 | Moore et al. ...................... 340/59 |
| 4,631,529 | 12/1986 | Zeitz ............................... 340/619 |
| 4,644,177 | 2/1987 | Barabino .......................... 250/577 |

OTHER PUBLICATIONS

Aeroquip Product Information and Application News, TIN-2, Summer 1986, "Tedeco Levelmaster Electro-Optic Liquid Level Sensor", 2 pages.
Aeroquip Tedeco Division Bulletin TDB L250, "Tedeco Levelmaster 250 Series", 1987, 2 pages.

Primary Examiner—Joseph A. Orsino
Assistant Examiner—Brian R. Tumm
Attorney, Agent, or Firm—Mitchell D. Bittman

[57] ABSTRACT

An apparatus to indicate a low level of liquid in a vessel, such as an automobile crankcase. A light-emitting diode and a phototransistor are coupled at the crankcase so that the light received by the phototransistor varies with rising or falling oil levels. The diode has a given maximum current rating. A unique pulse generating circuit applies a short duration, high-current pulse to the light-emitting diode to produce a correspondingly short but intense burst of radiant energy that is received by the phototransistor. The sensitivity of response is superior to that of a phototransistor employed with a light-emitting diode driven by low-level voltages giving rise to currents equal to or less than its steady-state rating. False readings are eliminated when the vehicle is on an incline, or when the ignition switch is improperly operated. Reliable functioning is had, even at high operating temperatures.

14 Claims, 3 Drawing Sheets

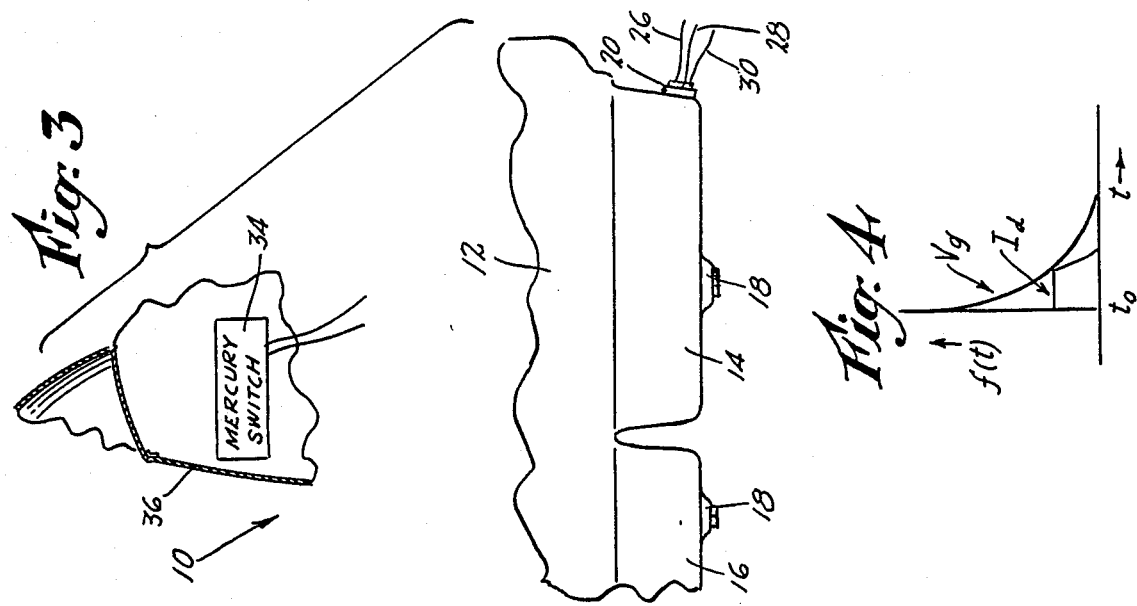
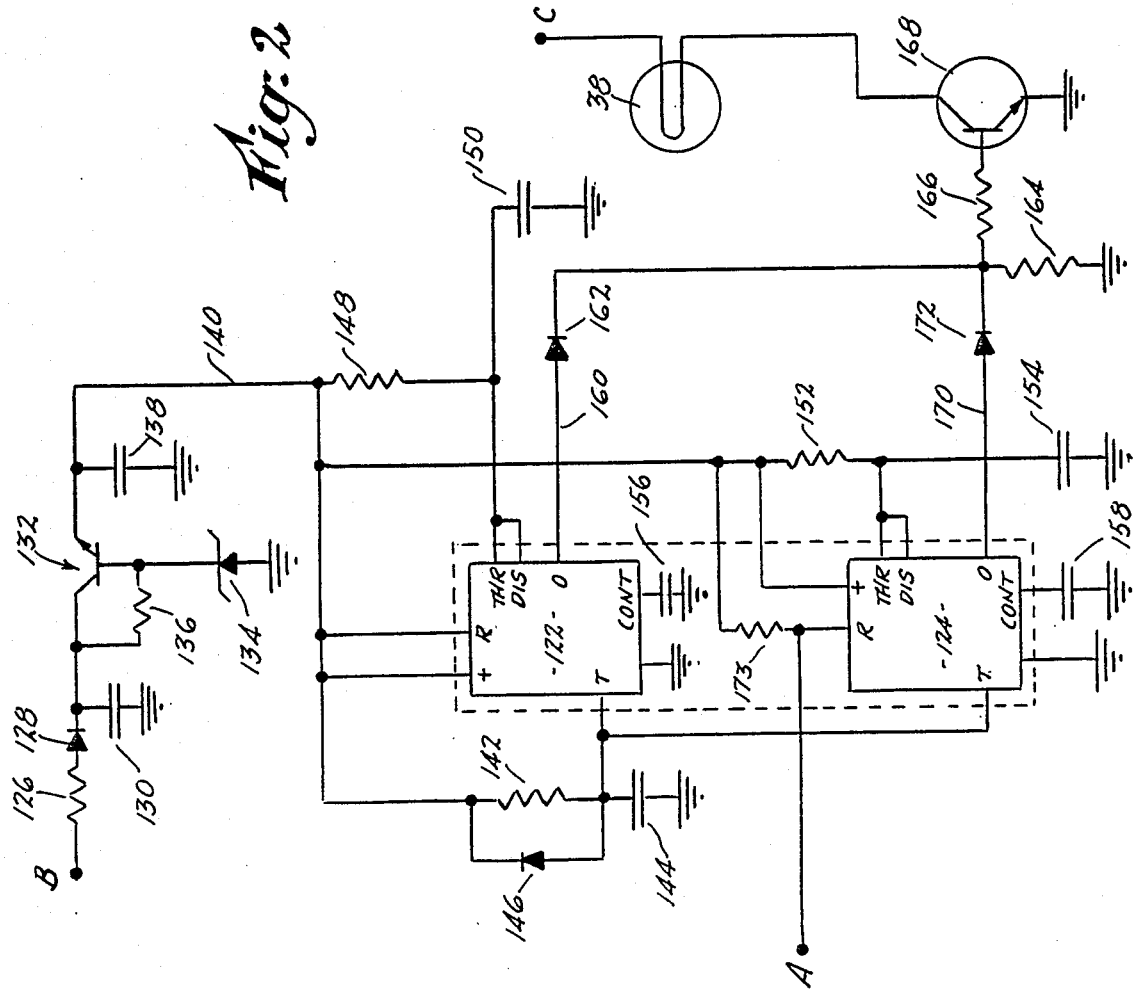

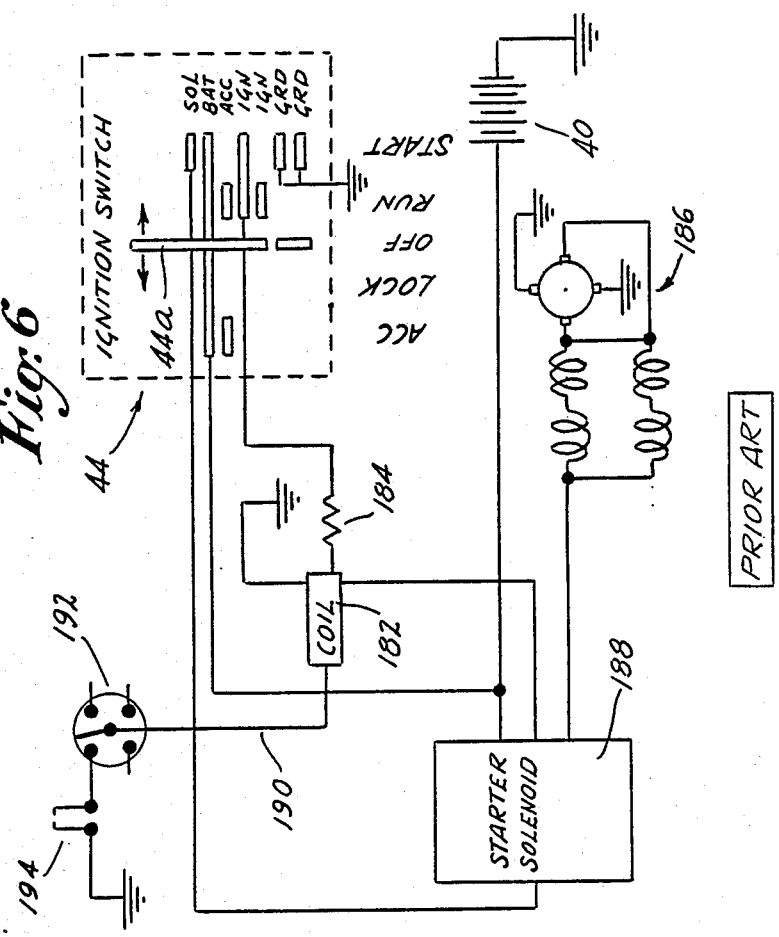
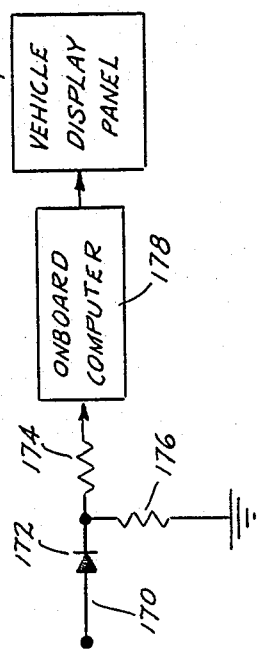

APPARATUS AND METHOD FOR MONITORING LIQUID LEVELS

CROSS REFERENCES TO RELATED APPLICATION

Copending application U.S. Ser. No. 068,575, now abandoned, filed July 1, 1987 in the names of Thomas Beauvais, Vincent Krenke, Peter Lupoli and Donald Mattis, entitled Liquid Level Gauging System, and having common ownership with the present application.

STATEMENT AS TO RIGHTS TO INVENTIONS MADE UNDER FEDERALLY-SPONSORED RESEARCH AND DEVELOPMENT.

Research and development of the present invention and application have not been Federally-sponsored, and no rights are given under any Federal program.

BACKGROUND OF THE INVENTION

1. Field of the Invention

This invention relates generally to liquid level gauging systems, and more particularly to devices of this type wherein coupled light-emitting diodes and transducers are immersed in vessels associated with internal combustion engines.

2. Description of the Related Art Including Information Disclosed Under 37 CFR §§1.97-1.99

The present invention involves improvements in the gauging system disclosed and claimed in the U.S. application above identified.

The gauge of this application employed a probe carrying a light-emitting diode which was excited from direct current, and a photoransistor disposed adjacent the light-emitting diode and arranged to receive refracted light therefrom through a lens of the probe. The probe was immersible in oil contained in the oil pan or crankcase of the vehicle.

While the disclosed circuit was considered to operate in a generally satisfactory manner, it was desired to improve its sensitivity. Initially, it was believed that such an increase could be achieved by substituting for the single stage phototransistor, a Darlington phototransistor. The added current gain did indeed provide the desired increased sensitivity, and was acceptable for relatively low temperature operation.

Where the gauge was employed to monitor the level of oil in crankcases, however, wide excursions of temperature were encountered, and at the high end of the expected temperature range, well above 100° C., the Darlington phototransistor exhibited leakage currents which tended to interfere with its proper operation, and to mask the measurements being made. As presently understood, the problem was a result of leakage current originating at the base-collector junction of the first stage of the Darlington phototransistor, feeding directly into the base of the second stage, where it was amplified thereby.

This problem associated with leakage was obviated by reverting to the use of a single stage phototransistor, as originally employed. However, there still existed the need to increase the sensitivity of the system and reduce the effect of heat, preferably without resorting to additional amplifiers or complex circuitry.

SUMMARY OF THE INVENTION

The problem of increasing the sensitivity of prior gauging systems is solved by the present invention, which has for one object the provision of a novel and improved liquid level indicating device which is both simple in its construction and at the same time of superior sensitivity, all without experiencing malfunctioning at high ambient temperatures.

A related object of the invention is to provide an improved liquid level indicating device as above set forth, which is reliable in operation, and wherein there is greatly minimized the possibility of false or erroneous readings being obtained.

Yet another object of the invention is to provide an improved liquid level indicating device as above characterized, wherein self-diagnostic circuitry is provided to check certain portions of the device so as to verify or confirm the operativeness thereof.

A still further object of the invention is to provide an improved liquid level indicating device as outlined above, wherein the standby current drain on the vehicle's electrical system is extremely low, such that it is compatible with virtually all types of vehicles and operable following extended periods during which the vehicle is idle, without causing any meaningful discharge of the vehicle's battery.

Still another object of the invention is to provide an improved liquid level indicating device of the kind described, wherein the components thereof are protected against damage due to inadvertent application of overvoltages, or voltages of reverse polarity.

The above objects are accomplished, in the embodiment of the invention illustrated, by a unique apparatus which very reliably indicates the level of liquid in a liquid-containing vessel of a vehicle, such apparatus having as one component an electro-responsive device which when excited, emits a beam of radiant energy or light. The electro-responsive device is of miniature size and is adapted for disposition in the liquid contained in the vessel. A transducer is coupled with the electro-responsive device and is responsive to the beam of radiant energy therefrom. In connection with a source of electricity for the electro-responsive device there is a circuit for producing a voltage pulse to excite the electro-responsive device. The pulse produces a current which has a magnitude which is appreciably in excess of the steady-state current rating of the electro-responsive device but notably is of a very short duration, insufficient to cause any damage to the device. In addition there is provided a switch that is intended to be actuated in conjunction with operation of the vehicle, such switch being connected to effect energization of the pulse-producing circuit from the source of electricity during the time that it is actuated.

The objects of the invention are further accomplished by a novel method of determining the level of liquid contained in a vessel, employing a radiant-energy emitting device and a coupled radiant-energy sensor and wherein the device and sensor are mounted in the vessel so as to be capable of sensing the liquid levels. The radiant-energy emitting device is characterized by a predetermined, maximum safe steady-state current rating, and the method comprises the steps of applying a short but intense volage pulse to the radiant-energy emitting device, the amplitude of the pulse being such as to cause current substantially in excess of the device's steady-state current rating, so as to effect a short-duration, high-intensity emission of energy from the device, and monitoring the response of the sensor during such application of current pulse, thereby to determine the absence or presence of liquid in the area along which the radiant energy passes as it travels from the radiant-energy emitting device to the sensor.

In the drawings there is illustrated an oil pan associated with an engine of an automotive vehicle, the oil pan having the usual drain plug. In accordance with the invention a novel probe is provided in the pan, which is intended to indicate a low level of oil in the pan only when certain desirable or prerequisite conditions relating to the vehicle are met; in this manner there is substantially eliminated the possibility of erroneous readings being provided to the vehicle operator at any time.

The novel probe carries an electro-responsive device which, when excited, emits a beam of radiant energy, and a transducer that is associated with or coupled to the electro-responsive device, mounted in such a position as to receive a portion of the energy therefrom. Maximum energy is transferred from the electro-responsive device to the transducer when no oil exists in the path of travel of the beam. An example of a mounting arrangement that has been found to be satisfactory is illustrated in U.S. application Ser. No. 068,575 identified above.

In the preferred, illustrated embodiment of the invention, the electro-responsive device is in the form of a light-emitting diode, and the transducer is a single phototransistor. In order to obtain a high beam intensity from the light-emitting diode, sufficient to properly excite the phototransistor for the purposes of the invention, I have discovered that instead of applying a nominal steady-state D. C. voltage to the light-emitting diode as in the prior gauges or liquid monitors, the application of a single high-amplitude voltage pulse of very short duration can be safely employed and results in a correspondingly short burst or emission of radiant energy which is many times more intense than that released under low-current, steady state conditions. The resultant energy of the beam arriving at the phototransistor is thereby increased by a factor of many times; changes in the amount of energy received can be correlated closely to the level of liquid (in the present instance, motor oil) which lies in the path of the beam passing from the light-emitting diode to the phototransistor. In the co-pending application above identified, changes in liquid level result in changes in the refractive index of the material adjacent the outermost face of the lens of the probe, and hence result in an increase or decrease in the amount of light refracted toward the phototransistor's sensing surface.

Also, by the present invention, the improved liquid level indicating apparatus is so arranged that certain conditions or prerequistes must be met prior to the exhibiting of a reading for the benefit of the vehicle's operator. These conditions are herein set forth below: If the ignition switch of the car has been on for more than 1 second, then in order for a reading to be given, the switch must be turned off and maintained in that condition for more than 15 seconds and thereafter turned on, at which time a low liquid level reading can be sent via an indicator, to the vehicle operator. Other time intervals could be provided in place of those just specified. The purpose of incorporating prerequisite conditions related to operation of the ignition switch is to prevent the possibility of false readings being given, resulting from what might be termed "jiggling" of the switch, that is, turning it on and off rapidly in succession a number of times. In general terms, the circuitry of the present invention prevents readings from being given to the operator except if he has just arrived at his vehicle, inserted the ignition key, and turned on the ignition switch once.

Transmission of a liquid level reading to the vehicle's operator is also inhibited if the vehicle is resting on an incline, typically 10°-15° or so, since such a condition results in a tilting of the oil pan and an accumulation of oil at a side wall. Inasmuch as the probe is mounted in a side wall, a false indication could be transmitted by the phototransistor, depending on the direction of incline of the vehicle. The present invention effectively circumvents such a possibility.

Finally, a major portion of the circuitry associated with the liquid level gauge of the present invention is energized continuously from the vehicle's electrical supply. By judicious choice of component types and interconnection of the various active devices, standby current drain is kept below 1 milliampere. Drain on the battery during idle periods of the vehicle is thus insignificant and of no concern unless the vehicle is to be idled for months at a time.

In addition, by the invention, there is provided complete protection of the circuitry against the application of overvoltage, and the application of voltages of reverse polarity, there-by to positively prevent inadvertent damage to the various solid state components constituting the liquid level indicating unit.

Other features and advantages will hereinafter appear.

BRIEF DESCRIPTION OF THE DRAWINGS

FIG. 2 is a schematic circuit diagram of another portion of the sensor, with the terminals labelled "A", "B" and "C" being intended for permanent connection to the correspondingly labelled terminals of FIG. 1.

FIG. 3 is a fragmentary view, partly in elevation and partly in section, of an automotive vehicle, particularly illustrating a mercury switch for detecting the inclination of the vehicle, and illustrating the vehicle's engine, and crankcase oil and transmission oil pans. A probe is mounted in the side wall of the crankcase oil pan.

FIG. 4 is a graph of gate voltage and drain current of the transistor that controls the light emitting diode, plotted versus time.

FIG. 5 is a schematic and block diagram of another embodiment of the invention, wherein a signal processor in the form of an on-board computer on the vehicle is employed to receive signals from the gauging apparatus, and to provide corresponding information to the vehicle operator, and FIG. 6 is a schematic circuit and block diagram of electrical equipment associated with the starting and operation of the vehicle.

DESCRIPTION OF THE PREFERRED EMBODIMENT

Figure 1:
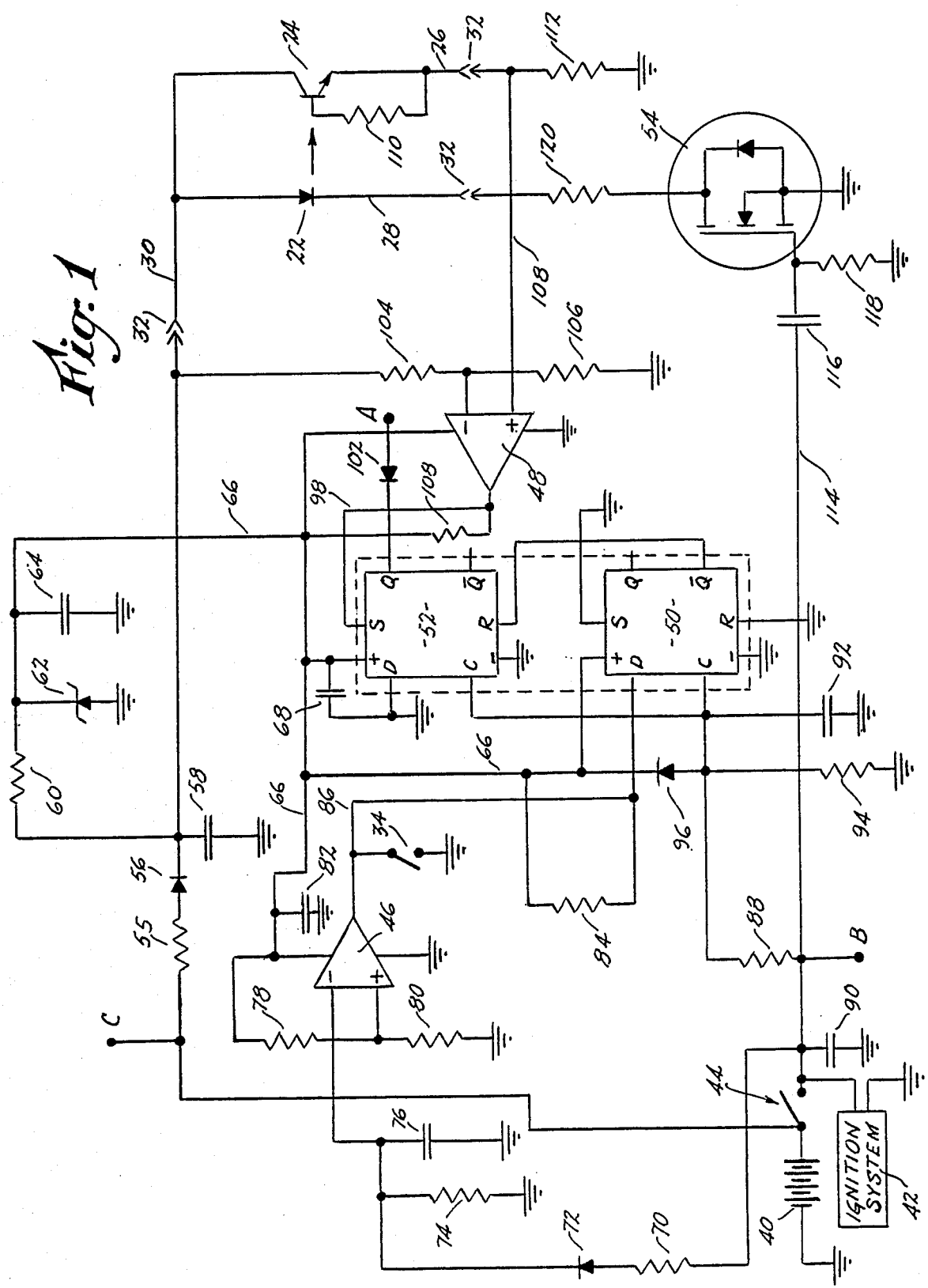
FIG. 1 is a schematic circuit diagram of a portion of the liquid level sensor of the present invention.

Referring particularly to the drawings, FIG. 3 illustrates the engine block 12 of an automotive vehicle 10, having the usual oil pan 14 and automatic transmission oil pan 16 both located below the block 12. Removable plugs 18 permit draining of the respective fluids as necessary, all in the usual manner.

Associated with the oil pan 14 is an oil level sensor in the form of a probe 20 that is mounted in the side wall of the pan. The probe 20 extends into the interior of the pan 14, and its inner end is immersed in the crankcase oil. Preferably the probe 20 takes the form of a hollow translucent or transparent rod (not shown) having a closed end forming a lens, all as illustrated in detail in the co-pending application above identified, and having an electro-responsive device in the form of a light-emitting diode 22 and a coupled transducer in the form of a phototransistor 24. These components are diagrammatically illustrated in FIG. 1. Three leads 26, 28 and 30 extend from the probe 20. The leads form part of the vehicle's wiring harness (not shown), and are connected to the remainder of the circuit in FIG. 1 by separable plugs and jacks 32.

In addition, mounted at a suitable location on the vehicle 10 is a gravity switch 34, which may take the form of a mercury switch or other type of control, such as a switch having a movable ball (not shown) arranged to bridge electrical contacts when the switch casing is tilted in a particular manner. Typically the switch 34 is carried underneath the vehicle dashboard 36 in a fixed position, or else mounted in the engine compartment, if space permits. The switch 34 is schematically indicated in FIG. 1.

Referring again to FIG. 1 and in accordance with the present invention, the light-emitting diode 22 is arranged to emit a short burst of radiant energy, typically infrared light, and the phototransistor 24 is coupled to and cooperable with the diode 22 and capable of receiving the burst and providing a reading whose amplitude is correlated to the level of oil contained in the crankcase 14. In accomplishing the emission of the burst, the light-emitting diode 22 is driven with a voltage pulse resulting in a current pulse whose pulse whose amplitude greatly exceeds the steady-state current rating of the device, but whose duration is sufficiently short that no damage occurs. Stated differently, while the instantaneous energy supplied to the light-emitting diode 22 is high, the average power supplied thereto is insufficient to cause any significant heating; consequently the device does not suffer any permanent damage.

I have discovered that by employing a light-emitting diode 22 having a steady-state current rating of 60 mA, a current pulse of 2 amperes can be well tolerated for a period of several hundred microseconds. The resultant burst of light is more intense by a factor of many times over that which would be obtainable were the light-emitting diode 22 excited from a steady-state d. c. source supplying current approximately equal to the steady-state current rating of the device.

The light received by the phototransistor 24 is similarly much greater, which in effect reduces the sensitivity requirements for the phototransistor 24 and permits a single stage unit to be employed, as opposed to a Darlington type. The capability of employing such a single stage phototransistor 24 is of extreme importance in high-temperature environments, since in multiple stage device, leakage currents develop and seriously interfere with proper operation at such high temperatures.

FIGS. 1 and 2 taken together constitute a composite schematic circuit diagram. The control circuit for the light-emitting diode 22 and phototransistor 24 is illustrated, as is the visual indicator device 38, which can take the form of an incandescent bulb on the vehicle dashboard 36, or other visual indicator such as a light-emitting diode (not shown). The device can be considered to be a signal processor, since it converts the information produced by the transducer into visual data.

As noted above, the terminal points labelled "A", "B", and "C" in FIG. 1 are intended to be permanently connected to the correspondingly labelled terminal points in FIG. 2.

FIG. 1 shows the vehicle battery 40 having its negative terminal connected to electrical ground, and its positive terminal extending to the vehicle's ignition switch 44, and then the vehicle's ignition system 42. FIG. 1 also shows two comparators 46, 48, and two Type D flip-flops 50, 52, the functioning of which will be explained below. The flip-flops 50, 52 can be contained in a single package, as shown by the dotted outline. Similarly, the comparators 46, 48 can be contained in a single package. They are not illustrated as such in this figure, in order to simplify the wiring diagram.

Also shown in the figure is a switching transistor 54 that controls the current pulse through the light-emitting diode 22.

Referring again to FIG. 1, the two comparators 46, 48 and the two flip-flops 50, 52 are continuously energized from the vehicle's battery through a resistor 55 and diode 56, which latter protects the circuit against the application of reverse polarity. Capacitor 58 functions as both a filter capacitor and as a source of charge (current) when the light-emitting diode 22 is pulsed by the transistor 54, as will be explained below.

Resistor 60 and Zener diode 62 provide protection against the application of overvoltage. Capacitor 64 is included, for noise reduction. The junction of the capacitor 64, Zener diode 62 and resistor 60 constitutes a positive supply line 66, through which the flip-flops 50, 52 and comparators 46, 48 are continuously supplied with +12 volts d. c. The flip-flops 50, 52 and comparators 46, 48 are energized all the time, although the total current drawn by these four components and associated circuitry is less than 1 mA, and battery drain is thus negligible. Capacitor 68 is a by-pass capacitor, for reducing noise on the supply line 66 at the location of the flip-flops 50, 52.

Connected to the ignition switch 44 is a resistor 70 and diode 72 extending to the inverting input of the comparator 46. Also connected to the inverting input are resistor 74 and capacitor 78. Resistors 78 and 80 provide the non-inverting input with a continuous bias voltage derived from the positive supply line 66. Power for the comparator 46 is similarly supplied through this line 66, with filtering provided by capacitor 82. The values of resistors 70 and 74 and capacitor 76 are chosen to provide a predetermined charging time constant for the capacitor 76 when the ignition switch 44 is initially closed, as will be explained further. Resistor 74 and capacitor 76 have a second, longer discharge time constant when the ignition switch 44 is opened, as will also be explained below.

Resistor 84 is a "pull-up" resistor for the output stage of the comparator 46. The particular unit employed has an output of the type known as "open drain", which necessitates the inclusion of the resistor 84. The output line 86 extends to the "D" (data) input of the flip-flop 50. Also, connected between the output line 86 and electrical ground is the switch 34 shown in FIG. 3, which closes when the vehicle is on an incline of more than 10°–15° or so. The output of the comparator 46 and the switch 34 are thus connected in a "wired OR" configuration. Stated differently, when either (1) the output of the comparator 46 is near ground; or (2) the switch 34 is closed as a result of the vehicle being on an incline; a "low" digital signal will appear at the "D" input of the flip-flop 50.

Flip-flop 50 has complementary output terminals Q and $\overline{Q}$. $\overline{Q}$ is connected to the reset terminal of flip-flop 52. Both the set and the reset terminals of flip-flop 50 are connected to electrical ground. The "clock" input terminals of both flip-flops 50, 52 are connected through a resistor 88 to the ignition switch 44, as shown. No connection to output Q of flip-flop 50 is made. Capacitors 90 and 92, and resistors 88 and 94 form a modified pi-network, which eliminates any tendency for contact bounce originating at the ignition switch 44 from disrupting the proper clocking of the flip-flops 50 and 52. Diode 96 protects the flip flops from overvoltage in that both inputs are clamped against exceeding +12 volts by more than 1 or 2 volts.

Referring now to flip-flop 52, the "D" input is grounded, and the set terminal is connected to the output line 98 of comparator 48. Resistor 108 is a "pull-up" resistor for comparator 48, similar to resistor 84 associated with comparator 46. No connection is made to output terminal $\overline{Q}$. Output Q extends to a diode 102, which in turn is connected to junction point "A" that is common to both FIGS. 1 and 2.

Bias is applied to the inverting input of comparator 48 by resistors 104, 106. The non-inverting input is connected via line 108 to the output of the phototransistor 24. Resistor 110 biases the phototransistor to an "off" condition in the absence of excitation by light. Resistor 112 constitutes a load.

Referring again to FIG. 1, the ignition switch 44 is also connected, via line 114, to a capacitor 116 which in turn extends to the gate of the switching transistor 54. A resistor 118 is connected to ground. These two components 116, 118 constitute an RC circuit which provides a short duration voltage pulse of several hundred microseconds on the gate of transistor 54 when the ignition switch 44 is initially closed (turned on). During the application of gate drive, transistor 54 conducts momentarily, effectively grounding one side of resistor 120, which is on the order of 5 ohms. The current flow to the anode of the light emitting diode 22 is supplied by the battery 40 and by the charge on capacitor 58, which has a value on the order of several hundred microfarads or more. As a consequence, a pulse of current flows through the light-emitting diode 22 for the short time interval noted above, giving rise to a brilliant but short burst of radiant energy from the device. The burst is picked up by the phototransistor 24, which, for a similarly short period conducts if the beam has not been intercepted by or otherwise absorbed by oil. The pulse is then applied via line 108, to the non-inverting input of comparator 48.

Referring now to FIG. 2, there are illustrated two timers 122, 124, which can be identical units contained in a single package, as shown. Terminal point "B" corresponds to point "B" of FIG. 1. Point "C" corresponds to point "C" of FIG. 1, and is the positive terminal of the battery 40. Thus, point "C" of FIG. 2 is always energized, whereas point "B" is energized only when the ignition switch 44 is on (closed).

In FIG. 2, extending from terminal "B" is a series resistor 126 and diode 128, and filter capacitor 130. A pass transistor 132 and associated Zener diode 134 and resistor 136 provide over-voltage protection to the circuitry of FIG. 2. Capacitor 138 constitutes a by-pass.

The emitter of transistor 132 is connected to a line 140 constituting a switched, positive supply line which is energized only when the ignition switch 44 is closed. The timers 122 and 124 are energized from the line 140, as shown.

Associated with timer 122 are resistor 142 and capacitor 144, and diode 146 which discharges the capacitor 144 when the ignition switch 44 is turned off. This avoids a situation where the charge on capacitor 144 maintains the trigger inputs "T" of timers 122 and 124 at a voltage higher than their supply voltage when the ignition switch has been closed and is suddenly opened.

The timing interval of timer 122 is determined by resistor 148 and capacitor 150, the junction of which is connected to its discharge and threshhold terminals. That of timer 124 is similarly determined by resistor 152 and capacitor 154. The reset terminal of timer 122 is connected to the switched, positive supply line 140. The voltage control, or "CONT", terminals of both timers 122, 124 extend through capacitors 156, 158, respectively to ground.

Output from timer 122 on line 160 extends through a diode 162 to a load resistor 164, and through a series resistor 166 to the base of a switching transistor 168. The collector of the transistor extends to the visual indicator bulb 38, whose other terminal, "C", is continuously connected to the vehicle battery 40, FIG. 1. The output of timer 124 extends via line 170 to a diode 172 which in turn is connected to the junction of resistors 164 and 166. Timers 122 and 124 are arranged so that a positive output signal from either will turn transistor 168 on, causing illumination of the visual indicator. The outputs are thus connected in an "OR" configuration.

Resistor 173 extends from the reset terminal of timer 124 to the switched positive supply line 140. This reset terminal also extends to terminal "A", which corresponds to terminal "A" of FIG. 1.

The operation of the control circuit of the present invention can now be readily understood by referring to FIGS. 1 and 2. Briefly, every time the ignition switch 44 is closed a survey of the oil level in the crankcase 14 is made by the light-emitting diode 22 and the phototransistor 24. However, the information so obtained is intended to be made available to the vehicle operator only under certain circumstances. In particular, illumination of the visual indicator 38 for a period of typically 30 seconds will occur only if: (1) the oil level is low, and (2) there are met certain conditions, relating to: (a) the inclination of the vehicle 10; and (b) the recent history of operation of the ignition switch 44.

As noted above, regardless of the condition of the ignition switch 44, the two comparators 46, 48 and the two flip-flops 50, 52 are continuously energized, assuming the circuit is functioning in a vehicle having a charged battery and an operative electrical system. In addition, voltage is applied from the battery 40 through resistor 55 and diode 56 to the anode of the light-emitting diode 22 and to the collector of the phototransistor 24.

Assuming for the moment that the vehicle has been idle and unattended, the voltage appearing on the inverting input of comparator 46 will be zero, and the output of the comparator 46 on line 86 will be high, since its non-inverting input is continuously biased by the divider string comprising resistors 78, 80, and due to the presence of the load resistor, or "pull-up" resistor 84. When the ignition switch 44 is initially closed, current flow through resistor 70 and diode 72 will slowly charge capacitor 76, and depending upon the time constant of resistors 70, 74 and capacitor 76, the output on line 86 will eventually assume a low state. In the present instance, preferred values of the components 70, 74 and 76 give rise to a time interval of about 1 second. Stated differently, about 1 second after the ignition switch 44 is closed, the output of the comparator 46 (line 86) shifts from a high to a low digital state. The voltage corresponding to this low state is applied to the "D" input of flip-flop 50. Simultaneously with the closing of the ignition switch 44, a positive voltage is applied to the clock input "C" of this flip flop 50. With the connections shown, the output line $\overline{Q}$ of flip-flop 50 will assume a high digital state, which in turn is applied to the reset input of the flip-flop 52. Under such circumstances, the output Q of flip-flop 52 assumes a low digital level, and remains latched in this condition, by the flip-flop 50, until the ignition switch is turned off, and thereafter turned on, to supply a new clock signal to the respective clock inputs "C" of the flip-flops 50 and 52. This in effect constitutes a sustaining action in that the output condition of the flip-flop 52 is held in either one of its two digital states until reclocking occurs. The flip-flops 50 and 52 thus constitute a latch means.

If the ignition switch 44 is closed for more than one second, the latched condition on the reset terminal of flip-flop 52 remains. After the ignition switch 44 is opened and maintained open for a longer time interval, typically more than 15 seconds, the charge on capacitor 76 which is connected to the inverting input of comparator 46, bleeds off through resistor 74, and a point is reached where the output of the comparator 46, line 86, changes from a low digital state to a high digital state once again. The diode 72 acts to block current flow from the charged capacitor 76 back into the ignition circuit, so that the time constant during the discharge of capacitor 76 is not affected by any other circuits connected to the ignition switch 44.

Thus, comparator 46 functions to provide a low digital level on its output line 86 after the ignition switch 44 has been closed for at least one second, and also for at least the first 15 seconds after it has been opened. The arrangement is intended to prevent false readings of oil level due to rapid operation or "jiggling" of the switch 44.

In addition, when the vehicle is on an incline, typically more than 10-15 degrees from horizontal, the switch 34, FIGS. 1 and 3, will close, pulling the line 86 to a low digital state, namely electrical ground. The grounding of the the data input "D" will cause the output $\overline{Q}$ of flip-flop 50 to assume a high digital state and become latched, in turn applying this to the reset input of flip-flop 52. With the reset input high, flip-flop 52 is prevented from responding to any signal on its set input terminal, the result of which will be explained in more detail below.

On the other hand, if the ignition switch 44 has been closed for less than 1 second, or open for more than 15 seconds, and the switch 34 is open, then the line 86 will assume a high digital level. The output terminal $\overline{Q}$ of flip-flop 50 will be low, as will the reset terminal of flip-flop 52, permitting the set input terminal of flip-flop 52 to accept an input and produce a corresponding output on terminal Q, which output will be indicative of oil level, as will be explained below.

As noted above, each time that the ignition switch 44 is manually closed by the vehicle operator, a survey of oil level is taken, but the information is not necessarily relayed to the operator. In FIG. 1, closure of the switch 44 results in a voltage pulse being applied to the gate of the transistor switch 54, which previously has been non-conducting due to the lack of gate drive. The pulse decays exponentially according to the time constant of the resistor 118 and capacitor 116, and in the present instance, the transistor switch 54 conducts for several hundred microseconds. The value of resistor 120, typically 4 or 5 ohms, permits a peak current of approximately 2 amperes to flow through the light-emitting diode 22. A good portion of the current is supplied by the charged capacitor 58, which is an electrolytic type having a value of several hundred microfarads. Under such circumstances, there exists a sufficient charge on this capacitor to supply most of the energy to the light-emitting diode 22, and under actual tests, it has been determined that the voltage drop due to the discharging of capacitor 58 during the duration of the pulse is only about 1 volt.

A plot of the gate voltage of transistor 54, and of the drain current thereof, appears in FIG. 4; the horizontal axis is time, and the vertical axis is an electrical function of time, f(t), namely volts in the case of the gate reading, and amperes in the case of the drain reading. It is assumed that the ignition switch is closed at $t_o$.

If the level of oil in the crankcase 14 is normal, the amount of radiant energy received by the phototransistor 24 will be less than if the level of oil is low. With a normal level, a pulse of small amplitude, typically less than 1 volt, appears at the emitter of the phototransistor or transducer 24 and is fed to the non-inverting input of the comparator 48. This 1 volt signal is thus an output produced by the transducer, and occurs when the ignition switch is turned on. The resistors 104, 106 establish the bias voltage applied to the inverting input, typically about 1 volt. With the amplitude of the phototransistor output being less than this value, the output voltage on line 98 of the comparator 48 will remain low. This low output will in turn remain applied to the set terminal of the flip-flop 52. With the connections illustrated, the output signal from terminal Q of flip-flop 52 will be low, and through diode 102, will keep the reset terminal of timer 124 at a low digital level under conditions of normal oil level.

When the ignition switch was manually closed, +12 volt battery voltage was immediately applied, through the connections "B" of FIG. 1 and "B" of FIG. 2, to the two timers 122 and 124 of FIG. 2.

As noted above, resistor 148 and capacitor 150 determine the time interval of timer 122, whereas resistor 152 and capacitor 154 determine the time interval of timer 124. In the present instance, the timer 122 provides a high output pulse on terminal O, which is applied through diode 162, to the junction of resistors 164 and 166. This pulse typically lasts 3 seconds. Regardless of the condition of the circuitry of FIG. 1, transistor 168 conducts for this 3 second interval, causing a 3 second illumination of the visual indicator 38. The vehicle operator is thus advised, by the 3 second illumination, that the indicator 38 is operative, as opposed to being burned out or otherwise damaged.

As shown in FIG. 2, the trigger terminals "T" of both timers 122 and 124 are connected in parallel. Triggering of the timers 122 and 124 occurs as a result of the time lag in the rise in voltage on their trigger terminals when positive voltage is applied to the supply terminals thereof. The trigger input terminals of each timer "detect" a negative-going pulse initially, with respect to the application of supply voltage.

The abbreviations, "THR", "DIS", "CONT", and "R" represent the words "threshhold", "discharge", "control voltage", and "reset", which are terminal designations normally associated with a Type 556 timer.

Timer 124 has its reset terminal connected through the resistor 173 to the switched positive supply line 140. Referring to FIG. 1, when the output Q of flip-flop 52 is high, indicating a low oil level in the crankcase 14, diode 102 does not conduct, and timer 124 is enabled to run in a "one-shot" mode, for approximately 30 seconds, causing transistor 168 to conduct, and illuminating the visual indicator 38 for 30 seconds. The relatively long 30 second interval of illumination alerts the vehicle operator that the oil level is low.

On the other hand, when the output Q of flip-flop 52 is low, the reset terminal of timer 124 is drawn to a low digital state. This effectively prevents the timer 124 from applying an output signal to the transistor 168. There thus does not occur any illumination of the indicator 38 beyond the 3 second interval provided by timer 122 noted above. The lack of output from timer 124 can thus be the result of a normal oil level reading, or else an indication that the control circuit of FIG. 1 has detected either that the car is not level or that required ignition switching sequence was not followed, i.e. the switch was on for more than a second without having been turned off thereafter for more than 15 seconds.

Another embodiment of the invention is shown in FIG. 5, wherein in place of the indicator 38, the vehicle's on-board computer is employed to receive the signals from the timer 124. FIG. 5 shows the line 170 extending from the timer 124, and diode 172 feeding a divider string comprising resistors 174 and 176. The on-board computer 178 processes the information received and displays on a panel 180, the results of the oil level survey. Such a display panel would likely be designed to contain a great deal of additional information relating to various aspects of the vehicle's operation and condition.

FIG. 6 illustrates additional features of portions of the electrical system of a motor vehicle. In particular, the ignition switch 44 is illustrated in more detail, having a slider 44a, and multiple switch positions "ACC", "LOCK", "OFF", "RUN" and "START". The "ACC" position is intended to permit operation of various accessories on the vehicle without energization of the ignition coil, indicated at 182. The travel of the slider 44a from the "OFF" position to the "RUN" position defines a precranking zone, and movement thereafter to the "START" position defines the cranking position of the slider. A ballast resistor 184 is associated with coil 182. The starter motor 186 and starting solenoid 188 are connected as illustrated, and function in the usual manner. The high tension lead 190 from the coil 182 goes to the distributor 192, which feeds a spark plug or ignition element 194, as usual. Generally the ballast resistor 184 is short-circuited by the starter solenoid during cranking of the engine, to compensate for reduced spark output resulting from the drop in battery voltage when the starter motor is operated. The ballast resistor is re-inserted in the circuit after the engine is running.

When the slider 44a of the ignition switch 44 is moved from the "LOCK" or "OFF" positions to the "START" position, it must first traverse the "RUN" position, wherein the coil 182 is energized.

According to the invention, the oil level survey provided by the circuits of FIGS. 1 and 2 is completed before the slider can arrive at the "START" position, wherein engine cranking commences. Thus, any reading is established well before agitation of oil in the crankcase occurs as a result of starting or running of the engine. It is considered that this feature of completing the reading prior to any starting or running of the engine is important since agitation of the oil could defeat any attempt at arriving at a valid measurement.

The invention also embraces a method of indicating the low level of liquid contained in a vessel 14, employing a radiant-energy emitting device 22 and a radiant-energy sensor 24, and including a mounting for the device and sensor in the vessel for disposition in the liquid. The radiant-energy emitting device 22 is characterized by a predetermined, maximum safe steady-state current rating. The method includes the steps of applying a voltage pulse to the radiant-energy emitting device 22 and wherein the resultant current pulse is characterized by an amplitude substantially in excess of the steady-state current rating, so as to effect a short-duration, high-intensity emission of energy from the radiant-energy emitting device 22, and monitoring the response of the sensor 24 during the application of the current pulse, to determine the absence or presence of liquid in the area along which the radiant energy passes as it travels from the radiant-energy emitting device 22 to the sensor 24. In the disclosed embodiment, the radiant-energy emitting device 22 is an infrared light-emitting diode, and the sensor 24 is a single stage phototransistor which is characterized by relatively low reverse leakage currents which flow across the collector-base junction, even at relatively high operating temperatures, well in excess of 100° C.

In the illustrated example, the steady-state current rating of the light-emitting diode 22 can be typically 60 mA, whereas the amplitude of the pulse that flows through the light-emitting diode 22 can be in the vicinity of 2 amperes, for a duration of 100–300 microseconds. The short duration of the pulse insures that overheating of the device 22 does not occur, since the average power which is dissipated by the device is extremely small, due to the shortness of the pulse.

The method of the invention includes the further steps of sensing if the ignition switch has been off for more than a first predetermined time interval, typically 15 seconds, and for intercepting oil level readings made by the light-emitting diode 22 and phototransistor 24, and preventing them from being observed by the vehicle operator if such an interval has not elapsed with the switch 44 off. Similarly, the method includes the additional steps of sensing if the ignition switch has been on for more than a predetermined time interval, typically one second, and for intercepting oil level survey readings made by the light-emitting diode 22 and phototransistor 24, and preventing them from being observed by the vehicle operator if the switch 44 has been on for at least such an interval.

Similarly, the method includes additional steps of detecting an incline of the vehicle, and for intercepting oil level survey readings and preventing them from being observed by the vehicle operator if a predetermined incline, typically 10–15 degrees from the horizontal, is exceeded.

Surprisingly I have found that the initial light output from the light-emitting diode 22 appears to be at a peak at the beginning of a period of voltage excitation, such light output decaying somewhat with time when the device is energized for a longer period. In effect, by the invention the light-emitting diode 22 is being energized at a time when its light-output/current characteristic is optimum, resulting in maximum instantaneous transfer of energy to the phototransistor 24.

The following component types have been found to provide satisfactory performance in the circuit of FIGS. 1 and 2. Comparators 46 and 48 are type TLC 372C; flip-flops 50 and 52 are type MC 14013B; timers are type NE 556. Transistor 54 is a type MTP 3055. Light emitting diode 22 is a type MLED 930; phototransistor 24 is a type MRD 30. Transistors 132 and 168 are both type 2N4401.

Details of the ignition switch shown in FIG. 6 originated from information contained in FIG. 6-23 on page 6-20 of a shop manual entitled, "1972 Cadillac Shop Manual", published by General Motors Corporation, Part No. 109 9560. The showing is intended for purposes of illustration only.

From the above it can be seen that I have provided a novel and improved liquid level sensor that is especially heat-resistant and both simple in its structure and particularly sensitive and reliable in use. In practice, no moving parts are required. All components are stationary, thus minimizing problems with contact deterioration, etc. The reliability inherent in solid state circuitry is realizeable.

Extensive measures have been incorporated in the circuitry in order to prevent damage to the active components, as from application of overvoltage, application of voltage of reverse polarity, and inadvertent damage to the circuitry from spikes or transients, ground currents and the like, which occur frequently in the modern automotive vehicle.

While the present description has been directed to a system especially adapted for monitoring the level of oil in an oil pan, the invention is not restricted to such applications. The disclosed device is applicable to other vessels associated with motor vehicles, such as transmission, power steering and brake reservoirs, radiator, gasoline tank, windshield washer fluid reservoirs or the like.

The device and method are thus seen to represent a distinct advance and improvement in the field of liquid monitoring systems.

Variations and modifications are possible without departing from the spirit of the invention.

Each and every one of the appended claims defines an aspect of the invention which is separate and distinct from all others, and accordingly it is intended that each cliam be treated as such when examined in the light of the prior art devices in any determination of novelty or validity.

I claim:

1. Apparatus for indicating the level of liquid in a liquid-containing vessel of an internal combustion engine of a vehicle, comprising in combination:
   (a) an electro-responsive device which when excited emits a beam of radiant energy, said device being adapted for disposition in the liquid contained in said vessel,
   (b) a transducer coupled with said electro-responsive device and responsive to said beam of radiant energy,
   (c) a source of electricity for said electro-responsive device,
   (d) means for producing a pulse to excite said electro-responsive device from said source of electricity, said pulse having a magnitude in excess of the steady-state current rating of said electro-responsive device but being of a duration which is insufficient to damage said device, and
   (e) a switch and electrical circuitry, said switch being actuated in conjunction with operation of said engine, said switch being connected to effect energization of said means for producing said pulse from said source of electricity during the time that it is actuated,
   (f) said pulse-producing means comprising an RC network and a solid state switching device, said RC network being connected between said switch and said solid state switching device, and said solid state switching device being connected with said electro-responsive device.

2. Apparatus for indicating to the operator of a vehicle, a low level of liquid in a liquid-containing vessel of an internal combustion engine of said vehicle, comprising in combination:
   (a) an electro-responsive device which when excited emits a beam of radiant energy, said device being adapted for disposition in the liquid contained in said vessel,
   (b) a transducer coupled with said electro-responsive device and responsive to said beam of radiant energy,
   (c) a source of electricity for said electro-responsive device,
   (d) means for producing a pulse to excite said electro-responsive device from said source of electricity, said pulse having a mangnitude in excess of the steady-state current rating of said electro-responsive device but being of a duration which is insufficient to damage said device, and
   (e) a switch and electrical circuitry, said switch being actuated in conjunction with operation of said engine, said switch being connected by said circuitry to effect energization of said means for producing said pulse from said source of electricity during the time that it is actuated,
   (f) said switch comprising the ignition switch of the vehicle,
   (g) visual indicating means responsive to the condition of said transducer, for providing the vehicle operator with an indication when the liquid level reaches a low point, and
   (h) timing means for sustaining said indication for predetermined time interval following the actuation of the ignition switch.

3. Apparatus for indicating to the operator of a vehicle, a low level of liquid in a liquid-containing vessel of an internal combustion engine of said vehicle, comprising in combination:
   (a) an electro-responsive device which when excited emits a beam of radiant energy, said device being adapted for disposition in the liquid contained in said vessel,
   (b) a transducer coupled with said electro-responsive device and responsive to said beam of radiant energy,
   (c) a source of electricity for said electro-responsive device,
   (d) means for producing a pulse to excite said electro-responsive device from said source of electricity, said pulse having a magnitude in excess of the steady-state current rating of said electro-responsive device but being of a duration which is insufficient to damage said device, (e) a switch and electrical circuitry, said switch being actuated in conjunction with operation of said engine, said switch being connected by said circuitry to effect energization of said means for producing said pulse from said source of electricity during the time that it is actuated, (f) said switch comprising the ignition switch of the vehicle, (g) visual indicating means responsive to the condition of said transducer, for providing to the vehicle operator an indication when the liquid level reaches a low point, and (h) electronic means for sensing if the ignition switch has been off for less than a predetermined time interval, and under such circumstance, for blocking the visual indicating means from providing to the vehicle operator said indication of low liquid level.

4. The invention as set forth in claim 3, wherein:
(a) said predetermined time interval is on the order of 15 seconds.

5. Apparatus for indicating to the operator of a vehicle, a low level of liquid in a liquid-containing vessel of an internal combustion engine of said vehicle, comprising in combination:

(a) an electro-responsive device which when excited emits a beam of radiant energy, said device being adapted for disposition in the liquid contained in said vessel, (b) a transducer coupled with said electro-responsive device and responsive to said beam of radiant energy, (c) a source of electricity for said electro-responsive device, (d) means for producing a pulse to excite said electro-responsive device from said source of electricity, said pulse having a magnitude in excess of the steady-state current rating of said electro-responsive device but being of a duration which is insufficient to damage said device, (e) a switch and electrical circuitry, said switch being actuated in conjunction with operation of said engine, said switch being connected by said circuitry to effect energization of said means for producing said pulse from said source of electricity during the time that it is actuated, (f) said switch comprising the ignition switch of the vehicle, (g) visual indicating means responsive to the condition of said transducer, for providing to the vehicle operator an indication when the liquid level reaches a low point, and (h) electronic means for sensing if the ignition switch has been on for more than a predetermined time interval, and under such circumstance, for blocking the visual indicating means from providing to the vehicle operator said indication of low liquid level.

6. The invention as set forth in claim 5, wherein:
(a) said predetermined time interval is on the order of one second.

7. Apparatus for indicating to the operator of a vehicle, a low level of liquid in a liquid-containing vessel of an internal combustion engine of said vehicle, comprising in combination:

(a) an electro-responsive device which when excited emits a beam of radiant energy, said device being adapted for disposition in the liquid contained in said vessel, (b) a transducer coupled with said electro-responsive device and responsive to said beam of radiant energy, (c) a source of electricity for said electro-responsive device, (d) means for producing a pulse to excite said electro-responsive device from said source of electricity, said pulse having a magnitude in excess of the steady-state current rating of said electro-responsive device but being of a duration which is insufficient to damage said device, and (e) a switch and electrical circuitry, said switch being actuated in conjunction with operation of said engine, said switch being connected by said circuitry to effect energization of said means for producing said pulse from said source of electricity during the time that it is actuated, (f) said switch comprising the ignition switch of the vehicle, (g) visual indicating means responsive to the condition of said transducer, for providing to the vehicle operator, an indication when the liquid level reaches a low point, and (h) timing means responsive to actuation of the ignition switch, for activating the visual indicating means in order to determine its operability.

8. Apparatus for indicating to the operator of a vehicle, a low level of liquid in a liquid-containing vessel of an internal combustion engine of said vehicle, comprising in combination:

(a) an electro-responsive device which when excited emits a beam of radiant energy, said device being adapted for disposition in the liquid contained in said vessel, (b) a transducer coupled with said electro-responsive device and responsive to said beam of radiant energy, (c) a source of electricity for said electro-responsive device, (d) means for producing a pulse to excite said electro-responsive device from said source of electricity, said pulse having a magnitude in excess of the steady-state current rating of said electro-responsive device but being of a duration which is insufficient to damage said device, (e) a switch and electrical circuitry, said switch being actuated in conjunction with operation of said engine, said switch being connected by said circuitry to effect energization of said means for producing said pulse from said source of electricty during the time that it is actuated, (f) said switch comprising the ignition switch of the vehicle, (g) visual indicating means responsive to the condition of said transducer, for providing to the vehicle operator an indication when the liquid level reaches a low point, (h) means for detecting an incline of the vehicle body from the horizontal, and (i) means for inhibiting the visual indicating means from providing, to the vehicle operator, said indication of low liquid level when a predetermined incline has been exceeded.

9. The invention as set forth in claim 8, wherein:
(a) said incline detecting means comprises a gravity operated switch.

10. Apparatus for indicating to the operator of a vehicle, a low level of liquid in a liquid-containing vessel of an internal combustion engine of said vehicle, comprising in combination:
- (a) an electro-responsive device which when excited emits a beam of radiant energy, said device being adapted for disposition in the liquid contained in said vessel,
- (b) a transducer coupled with said electro-responsive device and responsive to said beam of radiant energy,
- (c) a source of electricity for said electro-responsive device,
- (d) means for producing a pulse to excite said electro-responsive device from said source of electricity, said pulse having a magnitude in excess of the steady-state current rating of said electro-responsive device but being of a duration which is insufficient to damage said device,
- (e) a switch and electrical circuitry, said switch being actuated in conjunction with operation of said engine, said switch being connected by said circuitry to effect energization of said means for producing said pulse from said source of electricity during the time that it is actuated,
- (f) a signal processor for accepting the output of the transducer and for converting it to a readable low level indication, and
- (g) latch means connected with said switch and clocked thereby, for either blocking or else passing the output from said transducer to said signal processor.

11. The invention as set forth in claim 10, wherein:
- (a) said latch means is clocked by operation of said switch, and has an output signal which is sustained following clocking, until subsequent operation of said switch.

12. The invention as set forth in claim 10, wherein:
- (a) said transducer intermittently produces an output constituting an indication of low liquid level in the vessel,
- (b) said latch means sustaining the output from said transducer, following said indication.

13. The invention as set forth in claim 10, wherein:
- (a) said latch means has an input which responds to recent opening or closing of said switch.

14. The invention as set forth in claim 10, wherein:
- (a) said latch means has an input which responds to the inclination of the vehicle.

* * * * *